No. 785,243. PATENTED MAR. 21, 1905.
F. J. WEISS.
AXLE BEARING.
APPLICATION FILED AUG. 5, 1904.
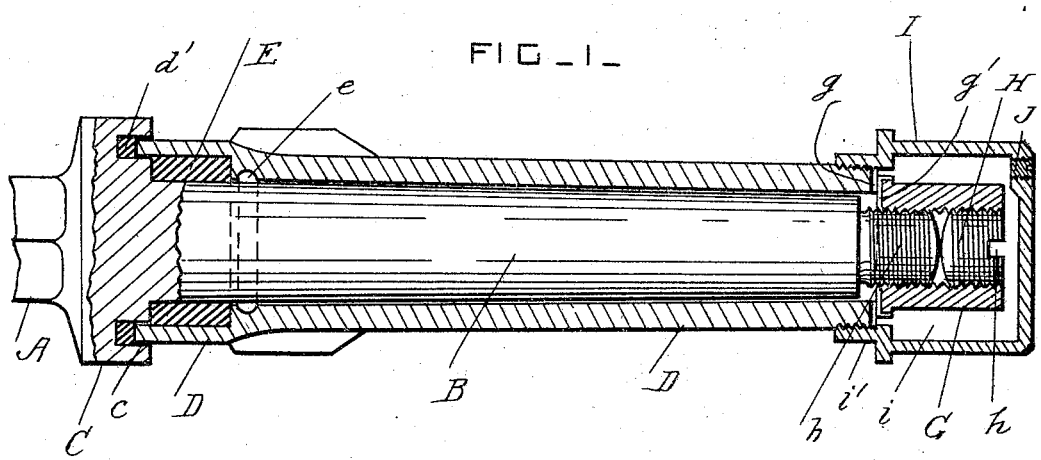
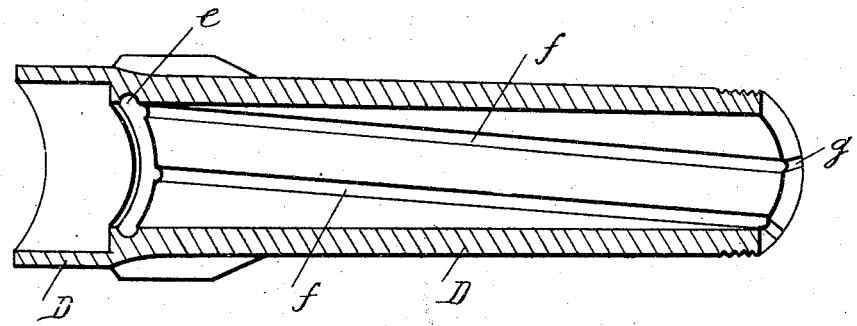
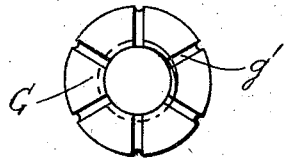 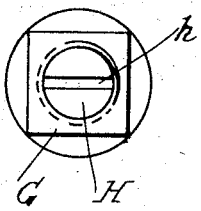 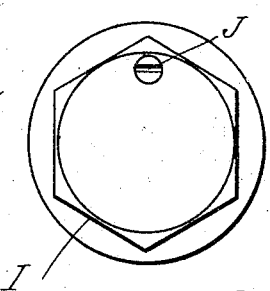
WITNESSES:
INVENTOR
Fred J. Weiss
BY
Herbert W. Jenner
Attorney No. 785,243.                                   Patented March 21, 1905.

UNITED STATES PATENT OFFICE.

FRED J. WEISS, OF FLINT, MICHIGAN.

AXLE-BEARING.

SPECIFICATION forming part of Letters Patent No. 785,243, dated March 21, 1905.

Application filed August 5, 1904. Serial No. 219,649.

*To all whom it may concern:*

Be it known that I, FRED J. WEISS, a citizen of the United States, residing at Flint, in the county of Genesee and State of Michigan, have invented certain new and useful Improvements in Axle-Bearings; and I do hereby declare the following to be a full, clear, and exact description of the invention, such as will enable others skilled in the art to which it appertains to make and use the same.

This invention relates to bearings for vehicle-axles; and it consists in the novel construction and combination of the parts hereinafter fully described and claimed; and it has for its object the production of a bearing which is dust-proof, oil-proof, and self-oiling, which is complete in itself, and in which it is not necessary to remove any part of the wheel or axle to supply the oil.

In the drawings, Figure 1 is a longitudinal section through the axle-bearing. Fig. 2 is a longitudinal section showing the sleeve in perspective. Fig. 3 is a view showing the face of the nut. Fig. 4 is a view showing the end of the nut. Fig. 5 is a view showing the end of the oil-cap.

A is a portion of a vehicle-axle of any approved construction.

B is its spindle, which is tapered from one end to the other and which is provided with a screw-threaded projection $b$ at its smaller end.

C is a collar at the larger end of the spindle, and $c$ is an annular groove formed in the face of the collar next to the spindle.

D is the spindle-sleeve, which is secured into the wheel-hub in any approved manner. This sleeve is revoluble upon the spindle B, and it is provided with a cylindrical projecting portion D at its larger end. The end of this projection is slidable in the groove $c$, and $d'$ is a packing of rawhide in the bottom of the said groove. The main portion of the projection forms a chamber which is filled with rawhide packing E, which surrounds the tapering portion of the spindle close to the said collar C.

A circumferential groove $e$ is formed in the end portion of the sleeve next to the packing-chamber, and $f$ represents spiral grooves in the sleeve from the said circumferential groove to the smaller end of the sleeve. Radial grooves $g$ are formed in the smaller end of the sleeve; but these grooves may be omitted, if desired.

G is a nut which is screwed upon the projection $b$ and which is provided with radial grooves $g'$ in its face, which comes next to the end of the sleeve; but these grooves may be omitted, if desired, when the grooves $g$ are provided in the sleeve, or both grooves $g$ and $g'$ may be used.

The nut G is made about twice as long as the projection, and H is a locking-plug which is screwed into the outer end portion of the nut. The ends of the plug and the projection are rounded, so that there will be less friction between them than between their screw-threads and the screw-threads of the nut, and the plug is provided with a notch $h$ or other approved means for enabling it to be screwed up hard against the end of the projection.

I is a cap which revolves with the sleeve. This cap has a chamber $i$ for containing oil, and the cap is preferably connected to the sleeve by a screw-threaded portion $i'$; but it may be connected to the sleeve in any other approved manner, so as to revolve with it and form an oil-tight joint.

J is a small plug in the cap, which is removed for the insertion of oil. The oil works along the spiral grooves and keeps the bearing constantly lubricated.

What I claim is—

1. The combination, with an axle-spindle provided with a collar at one end and a screw-threaded projection at its other end, of a spindle-sleeve provided with a circumferential groove in its end portion near the said collar and spiral grooves extending from the said circumferential groove to its other end, packing around the said spindle between the end portion of the sleeve and the said collar, a nut screwed on the said projection and preventing the said sleeve from sliding endwise, oil-passages being provided between the face of the nut and the end of the sleeve, and a cap which incloses the said nut and which forms an oil-chamber for supplying the said grooves with oil.

2. The combination, with an axle-spindle provided with a collar at one end having an annular groove in one face, and a screw-threaded projection at the other end of the spindle, of a spindle-sleeve provided with a projecting portion which forms a packing-chamber and the end of which engages with the said groove, said sleeve having also a circumferential groove near the said chamber and spiral grooves extending from the said circumferential groove to its other end, packing in the said annular groove and chamber, a nut screwed on the said projection and permitting oil to pass into the said sleeve, and a cap which incloses the said nut and which forms an oil-chamber for supplying oil to the sleeve.

In testimony whereof I have affixed my signature in the presence of two witnesses.

FRED J. WEISS.

Witnesses:
 GEO. E. NEWALL,
 A. R. HORTON.